United States Patent [19]

Sato

[11] 4,300,169
[45] Nov. 10, 1981

[54] FACSIMILE OPERATION METHOD

[75] Inventor: Mituhiro Satô, Atsugi, Japan

[73] Assignee: Ricoh Company, Ltd., Tokyo, Japan

[21] Appl. No.: 168,604

[22] Filed: Jul. 14, 1980

[30] Foreign Application Priority Data

Jul. 19, 1979 [JP] Japan .................................. 54/91929

[51] Int. Cl.³ .......................... H04N 1/32; H04N 1/22
[52] U.S. Cl. .................................... 358/256; 358/296
[58] Field of Search ....................... 358/256, 257, 296

[56] References Cited

U.S. PATENT DOCUMENTS

| | | | |
|---|---|---|---|
| 1,737,503 | 11/1929 | Küpfmüller | 358/296 |
| 3,084,213 | 4/1963 | Lemelson | 358/256 |
| 4,249,216 | 2/1981 | Kanda | 358/257 |

*Primary Examiner*—Howard Britton
*Attorney, Agent, or Firm*—Wyatt, Gerber, Shoup, Scobey & Badie

[57] ABSTRACT

A facsimile operation method comprising the steps of reading an original document for transmission, transmitting the image signals of the original document to a receiving side and, at the same time, transmitting part of image signals corresponding to the information appearing in part of the original document to a recording apparatus on the transmitting side, recording the image in the part of the original document on a record sheet by the recording apparatus, and after the completion of the transmission, comparing the images recorded on the record sheet with the images appearing on the original document so as to check whether or not the transmission has been made correctly.

7 Claims, 2 Drawing Figures

FACSIMILE OPERATION METHOD

BACKGROUND OF THE INVENTION

The present invention relates to an operation method of a facsimile apparatus for transmitting sentences or images appearing on original documents and more particularly to an operation method of a facsimile apparatus where images appearing on original documents are transmitted sucessively using an auto document feeder.

When a plurality of original documents are succesively fed into a facsimile apparatus by use of an auto document feeder, usually it is unnecessary for the operator to monitor the feeding condition of the original documents during the transmission. In this case, whether or not the original documents are correctly fed into the facsimile apparatus by the auto document feeder is confirmed by an original document counter or the like, which is disposed in the facsimile apparatus and which counts the number of original document fed and transmitted. However, by such an original document counter, it is not clear which original documents have not been subject to transmission due to some trouble, such as double-feeding. Therefore, conventionally, when a plurality of original documents are successively transmitted, those original documents are numbered and when the transmission of all the original documents has been completed, the operator on the transmitting side and the operator on the receiving side check those original documents by referring to the number assigned to each original document, using a telephone or the like.

Further, in some facsimile apparatus, there is provided a marking apparatus for making a mark on each original document, indicating the completion of transmission of that original doeument each time the reading of each original document has been completed. However, such marking apparatus is used only for that purpose and the facsimile apparatus provided with the marking apparatus is comparatively large in size and expensive. Furthermore, the marking apparatus needs replenishment of ink from time to time and handling of the apparatus is not always simple. In addition, the original documents tend to be smeared by the marking and such marking apparatus cannot be used in the case where such smearing original documents is not allowed.

Furthermore, when the same original documents are to be transmitting to a plurality of addresses, once the original documents have been marked, such marks may overlap when the original documents are transmitted to other addresses and those marks will not help the operator confirm whether or not the original documents have been correctly transmitted to the desired addresses.

SUMMARY OF THE INVENTION

It is therefore an object of the present invention to provide an operation method of a facsimile apparatus which makes it possible to confirm whether or not the information appearing on the original documents has been transmitted correctly and to discover misfeeding of original documents, if any and also to obtain an evidence showing that the transmission of the original documents has been made, and more particularly to provide an operation method of a facsimile apparatus which is effective when transmission of multiple original documents is conducted successively.

According to the present invention, part of the information appearing on each original document, for example, the images within several centimeters from the reading initiation end of each original document is recorded on a record sheet on the transmitting side. Therefore, the operator can confirm from the contents recorded on the record sheet whether or not the information appearing on each original document has been transmitted. When the destination and the transmission date are in the above-mentioned portion of each original document, the record sheet can be used as an evidence showing the destination and transmission date of the original documents.

DETAILED DESCRIPTION OF THE PREFERRED EMBODIMENT

Figure 1:
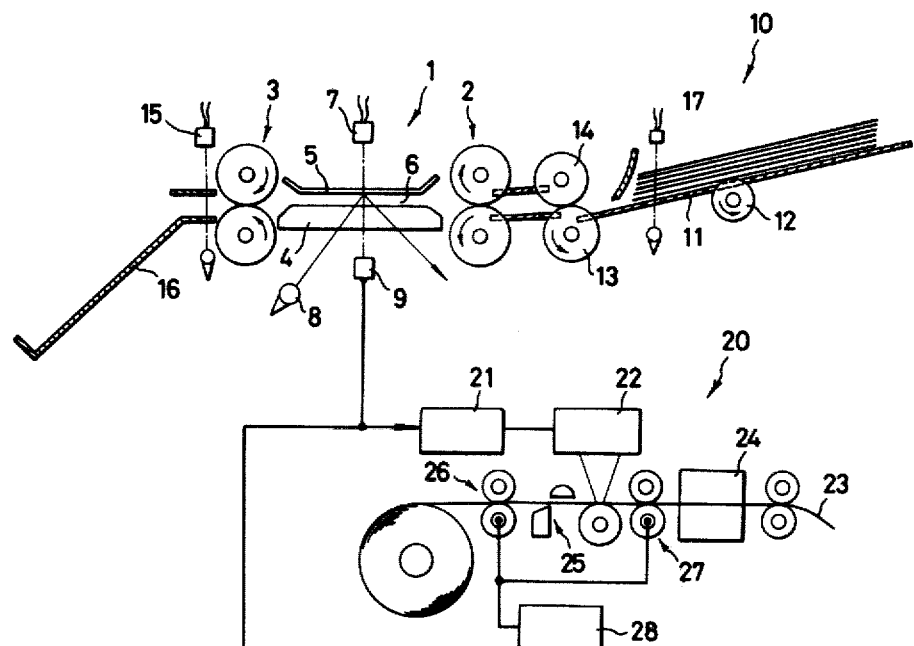
FIG. 1 shows diagrammatically a facsimile apparatus to which a facsimile operation method according to the present invention is employed.

Referring to FIG. 1, there is shown diagrammatically a facsimile apparatus to which a facsimile operation method according to the present invention can be applied. In the figure, a reference numeral 1 represents a reading apparatus of a transmitting-side facsimile. A reference numeral 10 represents an auto document feeder for feeding original documents successively into the reading apparatus 1, and a reference numeral 20, a recording apparatus of the transmitting-side facsimile, and a reference numeral 30, a receiving-side receiving apparatus.

When information appearing on the original document is transmitted, the original documents are stacked on an original document tray 11 of the auto document feeder 10 and a switch for continuous transmission (not shown) is operated, whereby two pairs of sheet feeding rollers 2 and 3, disposed on the opposite sides of a target glass 4 of the reading apparatus 1, a sheet feeding roller 12 and a sheet separation roller 13 of the auto document feeder 10 are driven, so that the bottom original document is separated from the stack of the original documents placed on the original document tray 22 by the sheet separation roller 13 and a stationary break roller 14. The separated original document is then fed into a reading path 6 between the target glass 4 and a guide plate 5. When the leading edge of the original document is detected by a scanning line sensor 7, the sheet feeding roller 12 and the sheet separation roller 13 are no longer driven. Thereafter, the two rollers 12 and 13 can be rotated by the movement of the original document. Further, when the leading edge of the original document is detected by the scanning line sensor 7, the original document is stopped temporarily at the detected position, so that the receiving apparatus 30 and the recording apparatus 20 are set ready to receive the information appearing on the original document. When this setting has been completed, the feeding of the original document by the sheet feeding roller pair 2 is resumed. And a reading apparatus 9 detects light reflected from the surface of the original document which is illuminated by a light source 8, converting the reflected light into an electric signal. As a result, the reading apparatus 9 generates an image signal, which is then input to both the receiving apparatus 30 and the recording apparatus 20. In accordance with the image signal generated by the reading apparatus 9, a record image is formed on a record sheet in the receiving apparatus 30.

Figure 2:
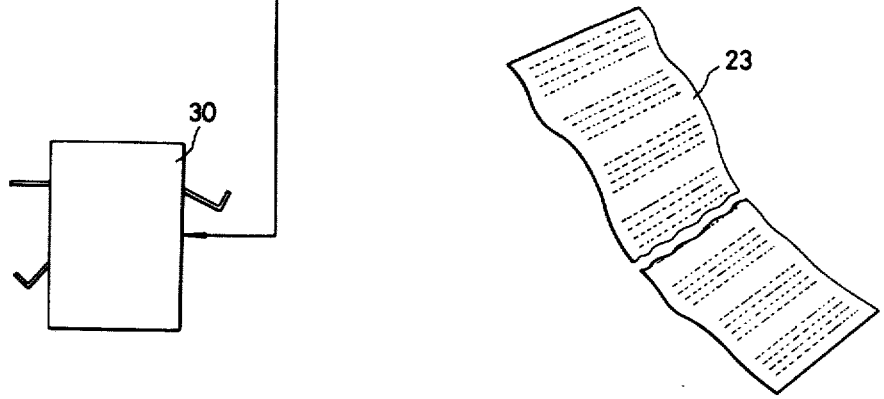
FIG. 2 shows schematically a record sheet which is obtained on the transmitting side.

Further, the image signal input to the recording apparatus 20 is then input to a plotter 22 via an amplifier 21, so that a latent electrostatic image corresponding to the image signal is formed on a record sheet 23 by the plotter. When this apparatus is employed on the receiving side, the image signal transmitted is input to the amplifier 21. The latent electrostatic image is then visualized by a development apparatus 14, so that a record image is formed on the record sheet 23. When the original document has passed through the sheet feeding roller pair 3 and its leading edge is detected by a leading edge detector 15, the transmission of the image signal produced by the reading apparatus 9 to the recording apparatus 20 is stopped and thereafter the image signal is continuously transmitted only to the receiving apparatus 30, so that all the information appearing on the original document is normally transmitted from the transmitting side to the receiving side. The recording sheet 23 in the recording apparatus 20 is advanced several millimeters by sheet feeding rollers 26 and 27 in order to place a vacant space thereon after the transmission of the image signal thereto has been stopped. The rotation of the sheet feeding rollers 26 and 27 is controlled by a control circuit 28. The control circuit 28 comprises a known stepping motor for driving the rollers 26 and 27 during the transmission and reception steps. When the rear edge of the original document is detected by the scanning line sensor 7 of the reading apparatus 1 on the transmitting side, the recording sheet in the receiving apparatus 30 is automatically cut in a size in conformity with the length of the original document. However, in the recording apparatus 20 on the transmitting side, such cutting of the record sheet paper is not performed. The original documents are successively fed into the reading apparatus 1 by the auto document feeder 10 and accordingly the information appearing on the original document is transmitted to the receiving apparatus 30. During the transmission, the information appearing on part of each original document is recorded on the record sheet 23 in the recording apparatus 20 on the transmitting side as illustrated in FIG. 2. When the rear edge of the last original document is detected by an original document presence detection sensor 17 and is then detected by the scanning line sensor 7, a cutter 25 of the recording apparatus 20 is actuated and the record sheet 23 is cut, whereby a record sheet on which the images of all the original documents transmitted are partly recorded is obtained on the transmitting side as shown in FIG. 2. If an original document happens to be skipped by misfeeding or double feeding during the automatic sheet feeding step, the information appearing on the skipped original document is not recorded at all on the record sheet 23. Therefore, by comparing the original documents transmitted with the record sheet on which part of the information appearing on each original document is recorded, such skipped original document(s) can be found out.

In the above-mentioned embodiment according to the present invention, the image signal of each original document is transmitted to the recording apparatus on the transmitting side until the leading edge of each original document is detected by the leading edge detector 15 which is disposed ahead of the scanning line sensor 7 in terms of the travelling direction of the original documents. However, the present invention is not limited to that embodiment, but another embodiment can be made, in which the image signal of each original document is transmitted to the recording apparatus on the transmitting side for a certain period of time after the leading edge of each original document has been detected by the scanning line sensor. That embodiment can be modified in such a manner that the image signal of each original document is transmitted to the recording apparatus on the transmitting side for a certain period of time after the information appearing on each original document has been actually read by the reading apparatus 9, since there may be a case where there is no image in the leading edge portion of an original document.

Further, in order to save the operator the trouble of comparing the record sheet with the original documents after the final transmission has been made and the transmission line disconnected, and finding out a skipped original document and resuming the transmission by connecting the transmission line again, a warning apparatus can be disposed, which gives a warning to the operator, before the reading of the last original document has been completed and the transmission line disconnected. The warning is based on a signal generated from the original document presence detection sensor when the sensor detects the rear edge of the last original document and gives the time for the operator to compare the original documents stacked on an original document discharge tray 16 with the record sheet bearing part of the information appearing on each original document and to find out a skipped original document. If the time is insufficient for the operator to check the skipped original document, the transmission apparatus can be designed so as not to disconnect the transmission line for a certain period of time after the rear edge of the last original document has been detected by the scanning line sensor.

According to the present invention, since the record sheet bearing part of the information appearing on each original document is obtained on the transmitting side, it can be confirmed by checking the record sheet whether or not all the information appearing on the original documents to be transmitted has been transmitted without any skip.

So far, the case where multiple original documents are transmitted has been explained. However, the present invention has its own advantage when a single original document is transmitted since the record sheet bearing part of the information appearing on the single original document can be used to confirm whether or not the transmission has been performed in fact and the same can also be used as an evidence for showing the fact that the transmission of the original document has been performed.

What is claimed is:

1. A facsimile operation method comprising the steps of:

reading an original document for transmission by a reading apparatus;

transmitting the image signals of said original document to a receiving side and, at the same time, transmitting part of image signals corresponding to the information appearing in part of said original document to a recording apparatus on the transmitting side; and recording the images in said part of the original document on a record sheet by said recording apparatus.

2. A facsimile operation method as claimed in claim 1, wherein said part of the original document is a leading edge portion of said original document in terms of the travelling direction thereof.

3. A facsimile operation method as claimed in claim 1 or 2, wherein said part of the original document is an image area in the leading edge portion of the original document in terms of the travelling direction thereof.

4. A facsimile operation method as claimed in claim 1, wherein said images in said part of the original document are recorded for a period of time in which said original document is advanced over a predetermined distance after the leading edge of said original document has been detected.

5. A facsimile operation method as claimed in claim 1, wherein said record images in said part of the original document are obtained by applying the image signals of said original document to said recording apparatus on the transmitting side until a predetermined period of time elapses after the leading edge of said original document has been detected by a scanning line sensor.

6. A facsimile operation method as claimed in claim 1, wherein said record images in said part of the original document are obtained by applying the image signals of said original document to said recording apparatus on the transmitting side for a predetermined period of time after reading of the information appearing on said original document has been initiated by said reading apparatus.

7. A facsimile operation method as claimed in claim 1, wherein said record images are recorded with a predetermined space therebetween with the transmission of each original document.

* * * * *